United States Patent Office 2,777,871
Patented Jan. 15, 1957

2,777,871

BIS N-SUBSTITUTED CARBAMIC ACID ESTERS OF POLYHYDRIC ALCOHOLS AND PROCESS

Franklin Strain, Barberton, Ohio, assignor to Columbia-Southern Chemical Corporation, Allegheny County, Pa., a corporation of Delaware No Drawing. Application August 5, 1952,
Serial No. 302,812

14 Claims. (Cl. 260—468)

This invention relates to the preparation of certain types of carbamate esters, and also to certain novel compounds produced thereby.

According to the present invention, carbamate esters have been prepared by reacting a bis-chloroformate of a dihydric alcohol, particularly a polyglycol, with a primary amine in the proportion of 2 moles of the amine per mole of the chloroformate, whereby both chloroformate groups of the chloroformate are reacted with the amine. The compounds thus produced have the structure

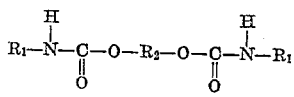

where $R_1$ is the radical of the primary amine $R_1NH_2$, and $R_2$ is the radical of a dihydric alcohol $R_2(OH)_2$.

The invention is applicable to the reaction of primary amines generally, with bis-chloroformates. Thus, the amines which may be used, according to this invention, include methyl amine, ethyl amine, allyl amine, n-propyl amine, isopropyl amine, n-butyl amine, tertiary butyl amine, isobutyl amine, the amyl amines, hexyl amines, lauryl amine, stearyl amine, cyclopentyl amine, cyclohexyl amine, methyl cyclohexyl amine, benzyl amine, chlorobenzyl amine, aniline, and haloanilines, particularly chloroanilines. Some of the chloroanilines that may be used include monochloroanilines such as metachloroaniline, orthochloroaniline, parachloroaniline; dichloroanilines, including 2,5 dichloroaniline, 2,3 dichloroaniline, etc.; trichloroanilines such as sym trichloroaniline (2,4,6 trichloroaniline); tetrachloroanilines and pentachloroaniline. Corresponding haloanilines, for example, the bromoanilines, also may be employed. The process also may be applied to substituted amines containing acidic or basic groups, such as β,β-diethoxyethyl amine, β-ethoxyethyl amine, monoethanol amine, glycine, the methyl, ethyl or other ester of glycine, etc.

Bis-chloroformates which may be used, according to this invention, include the bis-chloroformates of polyglycols, which are especially suitable, such as the di-, tri-, tetra- or hexaethylene glycols, dipropylene glycol, tripropylene glycol, dibutylene glycol, tributylene glycol, or the polyglycols of trimethylene glycol or pentamethylene glycol. Chloroformates of other dihydric alcohols, including bis-phenol A (the dihydroxy condensation product of acetone and phenol), ethylene glycol, propylene glycol, trimethylene glycol, hexamethylene glycol, styrene glycol, methylene glycol, p,p-dihydroxy diphenyl ether, bis (hydroxy benzyl) ether, octadecanediol, xylylene glycol, tartaric acid and its esters, resorcinol, 4,4-methylene bis-phenol, 2,4-methylene bis-phenol and equivalent alkylidene bis-phenols, phthalyl alcohol, etc., may be used.

The process is conducted by mixing the bis-chloroformate with the amine, substantially in the proportion of two equivalents of monoamine with one mole of the bis-chloroformate. Large excesses of the amine do not appear to be harmful. On the other hand, while some excess of bis-chloroformate is permissible, this excess should not be great, since but one of the chloroformate groups of a bis-chloroformate may take part in the reaction. Hence, the amount of amine added preferably should exceed 1.5 equivalents per mole of bis-chloroformate.

In general, substantially theoretical amounts of the reactants are used in the preparation of the carbamate esters. The reaction involving the amine and the bis-chloroformate may be promoted in the presence of an alkaline reagent. For this purpose, organic bases, as for example, trimethylphenyl ammonium hydroxide or pyridine, or inorganic bases including the hydroxides and carbonates of sodium and potassium, and oxides, hydroxides and carbonates of calcium, barium, strontium, and magnesium or other alkali or alkaline earth metal, are useful. The alkaline agent may be in solution, or may be dispersed as a finely pulverized solid material in the reaction mixture. Thus, finely divided calcium carbonate has been found to be effective. If it is desired, in those reactions involving an amine, an excess thereof may be employed to serve in lieu of an alkaline reagent. In this instance, the amine is converted into its hydrochloride, thus fixing the hydrochloric acid liberated during the course of the reaction.

Substantially, two equivalents of alkaline agent are used per mole of bis-chloroformate. As in the case of the amine, large excesses normally are not harmful and the amount used should exceed 1.5 equivalents per mole of bis-chloroformate.

The amidation reaction between the bis-chloroformate and amine preferably is conducted at temperatures below 25° C., in order to insure maximum yields. The reaction temperature will, however, depend upon the nature of the alkaline reagent employed. When pyridine or caustic soda is used, temperatures ranging from 15 to 25° C. are possible, but when calcium carbonate is used, it is desirable to operate at higher temperatures, for example, about 50° C. The amidation reaction may also be made more efficient by controlling the concentration of reactants. By using an excess of the amine, and the alkaline reagent, almost quantitative yields can be obtained in many cases. When operating under such circumstances, the excess of reagents may be recovered and used in subsequent preparations.

The amidation reaction may be conducted under substantially anhydrous conditions, although this is not essential. In fact, it is quite often desirable to employ aqueous solutions of the reactants to aid in controlling the reaction. Other diluents, such as carbon tetrachloride, ethylene dichloride, acetone or dioxane, can be added to the reaction mixture. After reaction has been completed, the products may be recovered by washing the reaction mixture with water or an aqueous alkaline solution, and thereafter heating the washed product in vacuo to distill off volatile components.

The herein contemplated process may be used to produce several novel compounds, as will appear from the ensuing examples. These compounds are low-melting solids which are insoluble in water, and are soluble in many organic solvents, including acetone, ethyl alcohol, xylene, toluene, benzene and chloroform. These compounds may be used to plasticize resinous compositions, such as cellulose acetate and like cellulose plastics, polyethylene, polystyrene, vinyl resins, synthetic rubber compositions, etc. The compounds formed by reaction of a bis-chloroformate and a chloroaniline have herbicidal properties.

The following examples are illustrative:

*Example I*

Four moles (257 g.) of 70% aqueous ethylamine and 4.2 moles (340 g.) of 50% aqueous sodium hydroxide solution were poured over approximately one kilogram of ice. Two moles (474 g.) of diethylene glycol bis-chloroformate of 97.5% assay was added slowly, with stirring, to the ice slurry, over a period of thirty minutes. The resulting mixture was then stirred for two hours, after which the solid product was separated by filtration. It was washed by stirring with 500 cc. of cold water acidified with a small amount of hydrochloric acid, then re-filtered and dried. The solid product, diethylene glycol bis (N-ethyl carbamate), melted at 66° C. When re-crystallized from benzene, it formed white needle-like crystals, melting point 67° C., which contained 11.5% nitrogen by analysis (theoretical nitrogen content 11.3%). The total yield of product, including some additional material which was recovered by saturation of the aqueous filtrates with sodium sulfate followed by filtration, amounted to 65% of the theoretical.

*Example II*

One mole (59 g.) of isopropyl amine and one mole (80 g.) of 50% sodium hydroxide were poured over crushed ice, after which one-half mole (119 g.) of 97.5% diethylene glycol bis-chloroformate was added slowly, with stirring, over a period of thirty-five minutes. Stirring was continued for an additional hour, after which the white solid product was filtered and washed. After re-slurrying in water acidified with hydrochloric acid as in the first example, the product, on final filtration and drying, weighed 95 g., a 69% yield, and melted at 61° C. It contained 10.3% nitrogen by analysis, as compared with the theoretical of 10.2% nitrogen. It was relatively insoluble in water, and had the following probable structure:

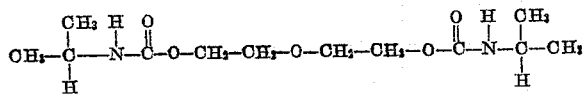

*Example III*

A solution of 5.5 moles (313 g.) of allyl amine, in 750 g. of benzene contained in a five-liter, three-necked flask equipped with thermometer, stirrer, and dropping funnel, was cooled to 5° C. by an ice-salt bath. Two and one-half moles (590 g.) of diethylene glycol bis-chloroformate of 97.6% assay was then added slowly, with stirring, while maintaining the temperature of the reaction mixture from 5–10° C. Thereafter, 5.5 moles (440 g.) of 50% aqueous sodium hydroxide was added, with stirring being continued to maintain the temperature of the reaction mixture below 10° C. The mixture was then allowed to warm to room temperature while being stirred, and diluted with about two liters of water acidified with hydrochloric acid. The oily phase was separated, washed again by shaking with water, and was dried over anhydrous sodium sulfate. On evaporation of the benzene solution, a waxy solid was obtained, melting at 49–50° C. and possessing a boiling point, with slight decomposition, of 215° C. at 1 mm. pressure. The yield, after re-crystallization from chloroform, was 570 g., or 84% of the theoretical. The product contained 10.2% nitrogen; calculated 10.9%. It possessed the following probable structural formula:

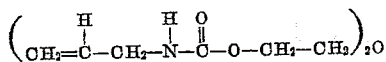

*Example IV*

To 55 g. of cyclohexyl amine in 200 cc. of ethylene dichloride was added 59 g. of diethylene glycol bis-chloroformate, while stirring, with maintenance of the temperature at from 5–10° C. Thereafter, 44 g. of 50% aqueous sodium hydroxide was added slowly, with stirring, while maintaining the same temperature. The mixture was then allowed to warm slowly to room temperature, while continuing the stirring for approximately one hour. Water was added, and the mixture decanted to a separatory funnel. The solid dicarbamate was partially insoluble in the ethylene dichloride phase. The aqueous phase was separated and the ethylene dichloride slurry was washed three times with water, after which it was distilled under partial vacuum to remove the ethylene dichloride solvent. White, solid, diethylene glycol bis (N-cyclohexyl carbamate), melting at 119° C., was obtained in 99% yield. The melting point was unchanged after re-crystallization from benzene. The carbon dioxide content was 24.4% by analysis, as compared with a theoretical of 24.7%; while the nitrogen content by analysis was 8.1%, as compared with a theoretical of 7.9%.

*Example V*

To a solution containing 409 g. of aniline in 1700 cc. of ethylene dichloride was added 462 g. of diethylene glycol bis-chloroformate, while stirring, and maintaining the temperature at from 0–5° C. The addition required two hours. Thereafter, 352 g. of 50% aqueous sodium hydroxide was added slowly, while continuing the stirring and maintaining the temperature at 0–10° C. by cooling. The resulting mixture was allowed to warm to room temperature, with continuous stirring. Approximately one liter of water was added, and the solid-containing oily phase was separated therefrom. This oily phase was washed twice with water and filtered to yield 415 g. of diethylene glycol bis (N-phenyl carbamate), melting point 102–107° C. After re-crystallization from 95% ethanol, a product melting at 113–114° C. was obtained. Evaporation of the ethylene dichloride filtrate resulted in an additional 122 g. of crude product which, combined with that initially obtained, amounted to a total yield of 78%. The re-crystallized product contained 8.1% nitrogen (theoretical 8.15%), and 25.6% $CO_2$ (theoretical 25.6% $CO_2$).

*Example VI*

Ethylene glycol bis(isopropyl carbamate) was prepared by the gradual addition of ethylene glycol bis-chloroformate to a stirred mixture of an excess of isopropylamine with crushed ice. A pasty solid phase formed which on continued stirring disintegrated to a white crystalline solid. The solid was separated by filtration and recrystallized from water yielding white needle-like crystals, M. P. 107° C.

*Example VII*

Two moles (255 grams) of metachloroaniline were placed in a three liter, round bottom, three necked flask equipped with a motor driven agitator, two dropping funnels and a thermometer. To this was added 255 grams of water and 400 milliliters of ethylene dichloride. This reaction mixture was cooled to between 5 and 15° C. by surrounding the flask with an ice. While vigorously agitating the contents of the flask, 1.05 moles (196.4 grams) of ethylene glycol bis-chloroformate and 352 grams of an aqueous solution of sodium hydroxide containing 25 percent by weight of sodium hydroxide were added dropwise and simultaneously from separate dropping funnels to the reaction mixture at a rate such that the temperature of the mixture was kept between 5° C. and 15° C. during the addition. This addition required 3 hours, and twice during this time 300 millimeter portions of ethylene dichloride were added to permit adequate agitation of the reactants.

After the addition of reactants was concluded, 200 milliliters of water were added and agitation was continued for 30 more minutes. Filtration of the resulting mixture, and washing of the filter cake with three 165 milliliter portions of water, and drying of the cake provided a 346.5 gram (93.9%) yield of ethylene glycol-bis-(N-3-chlorophenyl carbamate) which melted between 149.5° C. and 150.5° C.

The product was further purified by dissolving in 95 percent ethyl alcohol at boiling, filtering while hot, and permitting the filtrate to cool. When no further crystallization was observed, the mixture was filtered by suction and the crystals washed with ethyl alcohol. After drying in air, the ethylene glycol bis-(N-3-chlorophenyl carbamate) had a melting point between 151.7° C. and 152.6° C. and a 64% yield, based on the amount of metachloroaniline originally employed was obtained.

The procedure described in Example VII may be followed to prepare a large number of diester amides of a chloroaniline and a dihydric alcohol bis (acid carbonate) wherein both acid groups are amidated with the chloroaniline. Thus, orthochloroaniline may be substituted for metachloroaniline therein to prepare ethylene glycol bis-(N-2-chlorophenyl carbamate). Similarly, chloroanilines such as parachloroaniline, 2,5 dichloroaniline, 1, 3, 5 trichloroaniline or any of the other herein described chloroanilines may be used in lieu of metachloroaniline to prepare respectively ethylene glycol bis-(N-4-chlorophenyl carbamate), ethylene glycol bis(N-2,5-dichlorophenyl carbamate), ethylene glycol bis(N-1, 3, 5 trichlorophenyl carbamate), and other ethylene glycol bis-(N-chlorophenyl carbamates) corresponding to the chloroaniline reactant.

It is also possible to employ other bis-chloroformates in lieu of the ethylene glycol-bis-chloroformate employed in Example VII to prepare other valuable di-ester amides. Particularly suitable are the bis-haloformates of polyglycols such as di-, tri-, tetra-, or hexaethylene glycols, dipropylene glycol, tripropylene glycol, dibutylene glycol, tributylene glycol, the polyglycols of trimethylene glycol and pentamethylene glycol. Bis-chloroformates of propylene glycol, trimethylene glycol, hexamethylene glycol and methylene glycol are useful and may be substituted for the ethylene glycol bis-chloroformate employed in Experiment VII.

The diester amides of a chloroaniline and a dihydric alcohol bis (acid carbonate) wherein both acid groups are amidated with the chloroaniline are useful as herbicides, particularly as selective herbicides for broad leaf plants. They are generally higher melting point solids than other diester amides of primary amines. They are insoluble in water, and are soluble in many organic solvents including halogenated hydrocarbons such as chloroform, ethylene dichloride, carbon tetrachloride and perchloroethylene, benzene, acetone, xylene and ethyl alcohol.

The new class of diesters of chloroanilines and a dihydric alcohol bis (acid carbonate) herein contemplated which are notably suited as herbicides, particularly as selective herbicides for broad leaf plants, are diester amides obtained from glycols containing up to 6 glycol units and 6 carbon atoms or from lower liquid dihydric alcohols containing up to 10 carbon atoms. Thus, glycols and polyglycols containing up to 10 carbon atoms are useful in preparation of compounds having herbicidal properties. However, it is noted that diester amides of chloroanilines and higher dihydric alcohols also may be prepared by the process herein contemplated.

It is to be understood that the above examples are purely illustrative, and that other primary monoamines listed above may be reacted with the chloroformates set forth in the examples or other chloroformates set forth above, in the manner shown above. Moreover, other haloformates, including the corresponding bromoformates, may be used in lieu of the chloroformates herein set forth.

Although the present invention has been described with reference to the specific details of certain embodiments thereof, it is not intended that such details shall be regarded as limitations upon the scope of the present invention except insofar as included in the accompanying claims.

This application is a continuation-in-part of my co-pending application, Serial No. 134,133, filed December 20, 1949, now abandoned.

What is claimed:

1. A method of preparing a carbamate which comprises contacting a primary monoamine with a bis-chloroformate of a polyglycol and an acid neutralizing agent; the proportions of amine and acid neutralizing agents being two equivalents, respectively, per mole of chloroformate, and recovering from the resultant reaction mixture an ester amide of (a) the amine and (b) a bis acid carbonate of the polyglycol, wherein both acid groups of (b) are amidated with (a).

2. The process of claim 1 wherein the chloroformate is diethylene glycol bis-chloroformate.

3. A method of preparing a carbamate which comprises contacting a haloaniline with a bis-chloroformate of a dihydric alcohol and an acid neutralizing agent; the proportions of aniline and acid neutralizing agent being at least two equivalents, respectively, per mole of chloroformate, and recovering from the resultant reaction mixture an ester amide of (a) the haloaniline and (b) a bis acid carbonate of the dihydric alcohol, wherein both acid groups of (b) are amidated with (a).

4. A method of preparing a carbamate which comprises contacting a chloroaniline with a bis chloroformate of a dihydric alcohol and an acid neutralizing agent; the proportions of aniline and acid neutralizing agent being at least two equivalents, respectively, per mole of chloroformate, and recovering from the resultant reaction mixture an ester amide of (a) the chloroaniline and (b) a bis acid carbonate of the dihydric alcohol, wherein both acid groups of (b) are amidated with (a).

5. The method of preparing a carbamate which comprises contacting metachloroaniline with ethylene glycol bis-chloroformate and an acid neutralizing agent, the proportions of metachloroaniline and acid neutralizing agent being at least two equivalents, respectively, per mole of chloroformate, and recovering from the reaction mixture ethylene glycol bis (N-3 chlorophenyl) carbamate.

6. The method of preparing a carbamate which comprises contacting isopropyl amine with diethylene glycol bis-chloroformate and an acid neutralizing agent; the proportions of the amine and acid neutralizing agent being two equivalents, respectively, per mole of chloroformate, and recovering from the reaction mixture diethylene glycol bis (N-isopropyl) carbamate.

7. A method of preparing a carbamate which comprises contacting a primary monoamine with a bis-chloroformate of a dihydric alcohol and an acid neutralizing agent; the proportions of amine and acid neutralizing agents being two equivalents, respectively, per mole of chloroformate, and recovering from the resultant reaction mixture an ester amide of (a) the amine and (b) a bis acid carbonate of the dihydric alcohol, wherein both acid groups of (b) are amidated with (a).

8. A method of preparing a carbamate which comprises contacting a primary monoamine with a bis-chloroformate of a dihydric alcohol and an acid neutralizing agent; the proportions of amine and acid neutralizing agents being at least one and one-half equivalents, respectively, per mole of chloroformate, and recovering from the resultant reaction mixture an ester amide of (a) the amine and (b) a bis acid carbonate of the dihydric alcohol, wherein both acid groups of (b) are amidated with (a).

9. A method of preparing a carbamate which comprises contacting a primary monoamine with a bis-haloformate of a dihydric alcohol and an acid neutralizing agent; the proportions of amine and acid neutralizing agents being two equivalents, respectively, per mole of haloformate, and recovering from the resultant reaction mixture an ester amide of (a) the amine and (b) a bis acid carbonate of the dihydric alcohol, wherein both acid groups of (b) are amidated with (a).

10. The method of preparing a carbamate which comprises contacting cyclohexyl amine with diethylene glycol bis-chloroformate and an acid neutralizing agent; the proportions of the amine and acid neutralizing agent being two equivalents, respectively, per mole of chloroformate, and recovering from the reaction mixture diethylene glycol bis (N-cyclohexyl) carbamate.

11. Diethylene glycol bis (N-isopropyl) carbamate.

12. Diethylene glycol bis (N-cyclohexyl) carbamate.

13. A diester amide of (a) a chloroaniline and (b) a dihydric alcohol bis (acid carbonate) wherein both acid groups of (b) are amidated with (a), said dihydric alcohol containing up to 10 carbon atoms.

14. Ethylene glycol bis (N-3-chlorophenyl) carbamate.

References Cited in the file of this patent

UNITED STATES PATENTS

| | | |
|---|---|---|
| 1,927,858 | Ulrich et al. | Sept. 26, 1933 |
| 2,370,568 | Muskat et al. | Feb. 27, 1945 |
| 2,527,240 | Baird et al. | Oct. 24, 1950 |

OTHER REFERENCES

Rojahn: Ber., 54, 3119 (1921).
Beilstein: 12, 332 (1929); 227, 1st. Supp. (1933).
Linder: Chem. Abst. 45, 8180–1 (1951).